(12) United States Patent
Sugawara et al.

(10) Patent No.: US 11,762,072 B2
(45) Date of Patent: Sep. 19, 2023

(54) OPTICAL TESTING APPARATUS AND METHOD OF TESTING OPTICAL MEASURING INSTRUMENT

(71) Applicant: ADVANTEST Corporation, Tokyo (JP)

(72) Inventors: Toshihiro Sugawara, Gunma (JP); Takao Sakurai, Miyagi (JP)

(73) Assignee: ADVANTEST CORPORATION, Tokyo (JP)

( * ) Notice: Subject to any disclaimer, the term of this patent is extended or adjusted under 35 U.S.C. 154(b) by 558 days.

(21) Appl. No.: 16/987,810

(22) Filed: Aug. 7, 2020

(65) Prior Publication Data

US 2021/0109202 A1    Apr. 15, 2021

(30) Foreign Application Priority Data

Oct. 15, 2019  (JP) .................................. 2019-188822

(51) Int. Cl.
| | |
|---|---|
| *G01S 7/497* | (2006.01) |
| *G01S 17/894* | (2020.01) |
| *G01S 17/10* | (2020.01) |
| *G01S 7/481* | (2006.01) |

(52) U.S. Cl.
CPC ............ *G01S 7/497* (2013.01); *G01S 7/4815* (2013.01); *G01S 17/10* (2013.01); *G01S 17/894* (2020.01)

(58) Field of Classification Search
None
See application file for complete search history.

(56) References Cited

U.S. PATENT DOCUMENTS

| | | | | |
|---|---|---|---|---|
| 4,432,640 A | * | 2/1984 | Grage ................... | G01S 7/4972 356/4.02 |
| 9,110,154 B1 | * | 8/2015 | Bates ....................... | G01S 17/08 |
| 2007/0024842 A1 | * | 2/2007 | Nishizawa .............. | G01S 7/487 356/5.01 |

FOREIGN PATENT DOCUMENTS

| | | | | |
|---|---|---|---|---|
| DE | 3730548 A1 | * | 3/1989 | ........... G01S 7/4972 |
| JP | 2000-275340 | | 10/2000 | |
| JP | 2006-126168 | | 5/2006 | |
| JP | 2017-015729 | | 1/2017 | |

\* cited by examiner

*Primary Examiner* — Luke D Ratcliffe
(74) *Attorney, Agent, or Firm* — Greenblum & Bernstein, P.L.C.

(57) ABSTRACT

An optical testing apparatus is used in testing an optical measuring instrument. The optical measuring instrument provides an incident light pulse from a light source to an incident object and receives a reflected light pulse as a result of reflection of the incident light pulse at the incident object. The optical testing apparatus includes two or more testing light sources, two or more optical penetration members, and a wave multiplexing section. The two or more testing light sources each output a testing light pulse. The two or more optical penetration members each have an optical penetration region and receive the testing light pulse from each of the two or more testing light sources for penetration through the optical penetration region. The wave multiplexing section multiplexes the testing light pulses penetrating through the two or more optical penetration members for provision to the optical measuring instrument.

13 Claims, 15 Drawing Sheets

Actual Use Aspect

Testing Use Aspect

Ideal Measurement Result

Actual Measurement Result

Actual Measurement Result (in Unmeasurable Case)

Ideal Measurement Result

Actual Measurement Result

Actual Measurement Result (in Unmeasurable Case)

Actual Use Aspect

Testing Use Aspect

OPTICAL TESTING APPARATUS AND METHOD OF TESTING OPTICAL MEASURING INSTRUMENT

BACKGROUND OF THE INVENTION

Field of the Invention

The present invention relates to testing an instrument arranged to receive reflected light.

Description of the Related Art

There has conventionally been known an optical measuring instrument arranged to provide incident light to a distance measuring object and receive reflected light. The distance between the optical measuring instrument and the distance measuring object is measured (see Japanese Patent Application Publication Nos. 2017-15729, 2006-126168, and 2000-275340, for example). It is noted that as a sensor for image acquisition based on such a distance measurement is known a ToF (Time of Flight) sensor.

SUMMARY OF THE INVENTION

Such a related art optical measuring instrument as described above is tested by reproducing an actual measurement expected environment. However, reproducing such an actual environment is cumbersome.

It is hence an object of the present invention to test an optical measuring instrument without reproducing an actual measurement expected environment.

According to the present invention, an optical testing apparatus used in testing an optical measuring instrument that provides an incident light pulse from a light source to an incident object and receives a reflected light pulse as a result of reflection of the incident light pulse at the incident object, includes: two or more testing light sources that each output a testing light pulse; two or more optical penetration members that each have an optical penetration region and receive the testing light pulse from each of the two or more testing light sources for penetration through the optical penetration region; and a wave multiplexing section that multiplexes the testing light pulses penetrating through the two or more optical penetration members for provision to the optical measuring instrument, wherein the optical penetration regions correspond, respectively to fixed distance planes each having a fixed distance from the optical measuring instrument in the incident object, the testing light pulses have their respective different arrival times after being output before arriving at the wave multiplexing section, and the difference between the arrival times corresponds to the interplanar distance between the fixed distance planes.

The thus constructed optical testing apparatus is used in testing an optical measuring instrument that provides an incident light pulse from a light source to an incident object and receives a reflected light pulse as a result of reflection of the incident light pulse at the incident object. Two or more testing light sources each output a testing light pulse. Two or more optical penetration members each have an optical penetration region and receive the testing light pulse from each of the two or more testing light sources for penetration through the optical penetration region. A wave multiplexing section multiplexes the testing light pulses penetrating through the two or more optical penetration members for provision to the optical measuring instrument. The optical penetration regions correspond, respectively, to fixed distance planes each having a fixed distance from the optical measuring instrument in the incident object. The testing light pulses have their respective different arrival times after being output before arriving at the wave multiplexing section. The difference between the arrival times corresponds to the interplanar distance between the fixed distance planes.

According to the optical testing apparatus of the present invention, the optical measuring instrument may be a ToF sensor.

According to the optical testing apparatus of the present invention, the testing light sources may be laser diodes.

According to the optical testing apparatus of the present invention, the testing light sources may be light emitting diodes.

According to the optical testing apparatus of the present invention, the optical penetration members may be liquid crystal panels.

According to the optical testing apparatus of the present invention, the optical penetration members may be films.

According to the optical testing apparatus of the present invention, the wave multiplexing section may be a half mirror.

According to the optical testing apparatus of the present invention, the wave multiplexing section may be a dichroic mirror.

According to the optical testing apparatus of the present invention, the wave multiplexing section may be a polarizing beam splitter.

According to the present invention, a method of testing an optical measuring instrument includes: receiving, by the optical measuring instrument, a resultant of multiplexing of the testing light pulses from the optical testing apparatus according to the present invention; obtaining the shape of any one or more of the fixed distance planes based on a light receiving result in the receiving the resultant; and evaluating the light receiving performance of the optical measuring instrument based on the obtained shape.

According to the present invention, a method of testing an optical measuring instrument includes: receiving, by the optical measuring instrument, a resultant of multiplexing of the testing light pulses from the optical testing apparatus according to the present invention; obtaining the boundary between the fixed distance planes based on a light receiving result in the receiving the resultant; and evaluating the light receiving performance of the optical measuring instrument based on the obtained boundary.

According to the present invention, a method of testing an optical measuring instrument includes: receiving, by the optical measuring instrument, a resultant of multiplexing of the testing light pulses from the optical testing apparatus according to the present invention; obtaining the interplanar distance between the fixed distance planes based on a light receiving result in the receiving the resultant; and evaluating the light receiving performance of the optical measuring instrument based on the obtained interplanar distance.

According to the present invention, a method of testing an optical measuring instrument includes: receiving, by the optical measuring instrument, a resultant of multiplexing of the testing light pulses from the optical testing apparatus according to the present invention; obtaining the horizontal distance between any two points in the incident object based on a light receiving result in the receiving the resultant; and evaluating the light receiving performance of the optical measuring instrument based on the obtained horizontal

DESCRIPTION OF THE PREFERRED EMBODIMENTS

Preferred embodiments of the present invention will hereinafter be described with reference to the accompanying drawings.

First Embodiment

Figure 1A:
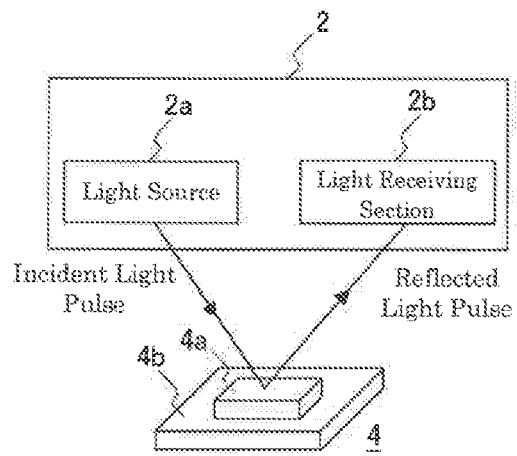
FIG. 1A shows an actual use aspect of an optical measuring instrument 2.
Figure 1B:
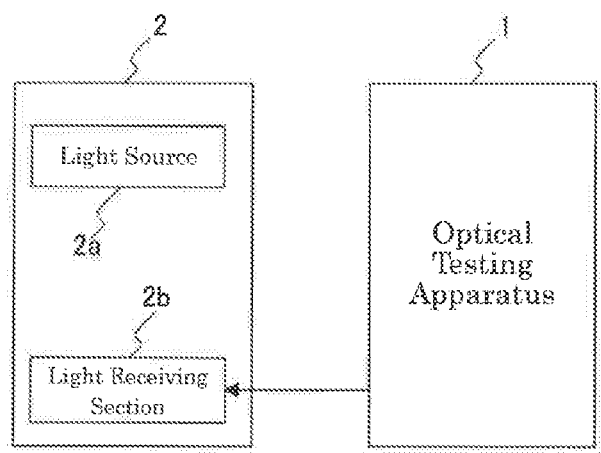
FIG. 1B shows a testing use aspect of an optical measuring instrument 2.
Figure 2A:
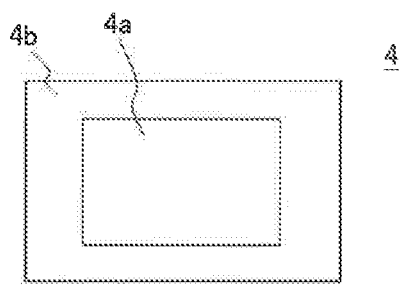
FIG. 2A shows a plan view of an incident object 4 according to a first embodiment.
Figure 2B:
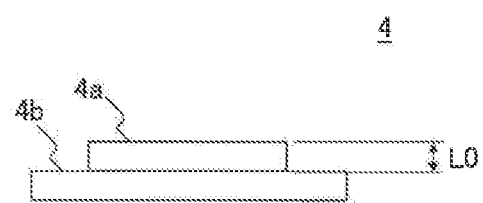
FIG. 2B shows a front view of an incident object 4 according to a first embodiment.

FIG. 1 shows an actual use aspect (FIG. 1A) and a testing use aspect (FIG. 1B) of an optical measuring instrument 2. FIG. 2 shows a plan view (FIG. 2A) and a front view (FIG. 2B) of an incident object 4 according to a first embodiment.

Referring to FIG. 1A, in the actual use aspect, the optical measuring instrument 2 provides an incident light pulse from a light source 2a to an incident object 4. The incident light pulse is reflected at the incident object 4 to be a reflected light pulse and received by a light receiving section 2b of the optical measuring instrument 2. The optical measuring instrument 2 is, for example, a LiDAR module or a ToF camera and used to measure the distance between the optical measuring instrument 2 and the incident object 4 or acquire an image based on the measured distance.

Referring to FIG. 2, the incident object 4 has a two-stepped shape with a convex portion provided on a cuboid. The optical measuring instrument 2 is located immediately above the incident object 4, and the planes 4a and 4b have their respective fixed distances from the optical measuring instrument 2. The planes 4a and 4b will hereinafter be referred to as fixed distance planes 4a, 4b. It is noted that the step in the incident object 4 is the distance L0 between the fixed distance planes 4a and 4b (hereinafter referred to as "interplanar distance").

Referring to FIG. 1B, the optical testing apparatus 1 is used to test the optical measuring instrument 2. The test is arranged to evaluate, for example, the light receiving performance of the light receiving section 2b of the optical measuring instrument 2. The optical testing apparatus 1 is arranged to provide a reflected light pulse equivalent to the optical measuring instrument 2.

Figure 15A:
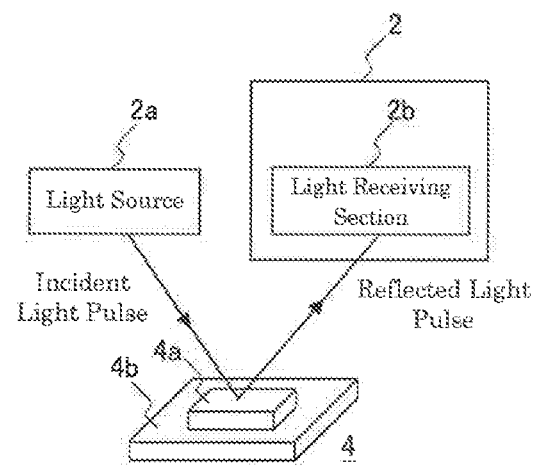
FIG. 15A shows an actual use aspect of an optical measuring instrument 2 according to a variation.
Figure 15B:
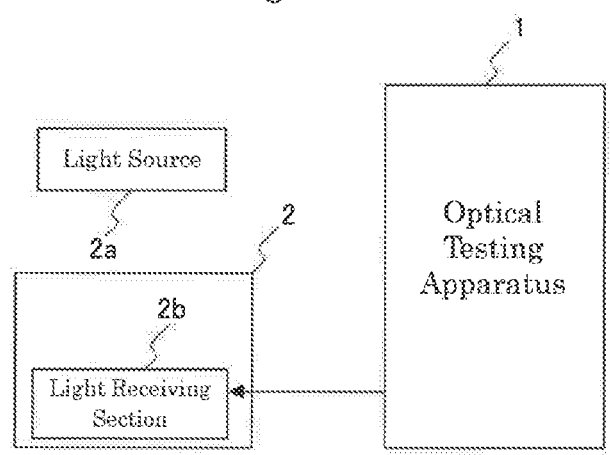
FIG. 15B shows a testing use aspect of an optical measuring instrument 2 according to a variation.

FIG. 15 shows an actual use aspect (FIG. 15A) and a testing use aspect (FIG. 15B) of an optical measuring instrument 2 according to a variation. While FIG. 1 shows that the optical measuring instrument 2 has the light source 2a and the light receiving section 2b, the optical measuring instrument 2 may only have the light receiving section 2b and the light source 2a may be arranged exterior to the optical measuring instrument 2, as shown in FIG. 15. The optical measuring instrument 2 is, for example, a ToF sensor. In any embodiment of the present invention, either the optical measuring instrument 2 shown in FIG. 1 or the optical measuring instrument 2 shown in FIG. 15 may be used.

Figure 3:
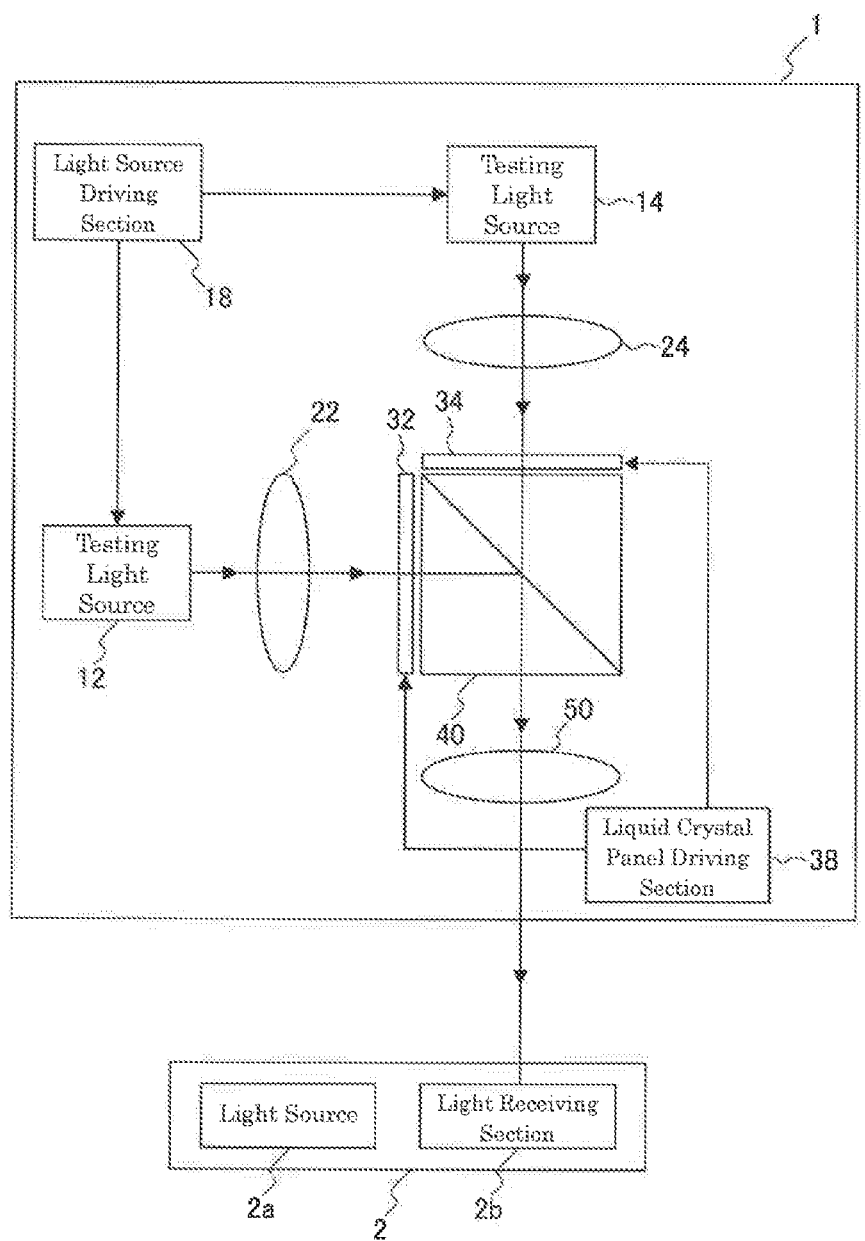
FIG. 3 is a functional block diagram showing the configuration of the optical testing apparatus 1 according to the first embodiment of the present invention.

FIG. 3 is a functional block diagram showing the configuration of the optical testing apparatus 1 according to the first embodiment of the present invention. Referring to FIG. 3, the optical testing apparatus 1 according to the first embodiment includes testing light sources 12, 14, a light source driving section 18, condenser lenses 22, 24, liquid crystal panels (optical penetration members) 32, 34, a liquid crystal panel driving section 38, a half mirror (wave multiplexing section) 40, and an imaging lens 50.

The two or more testing light sources 12, 14 are each arranged to output a testing light pulse. It is noted that the testing light sources 12, 14 are, for example, laser diodes or light emitting diodes.

Figure 5A:
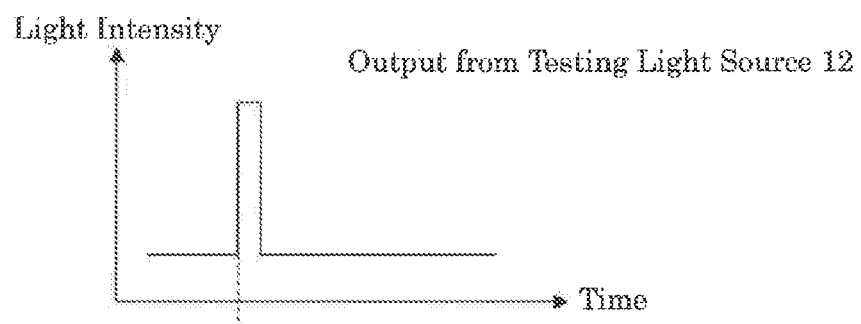
FIG. 5A shows timing chart of a testing light pulse output from the testing light source 12 according to the first embodiment.
Figure 5B:
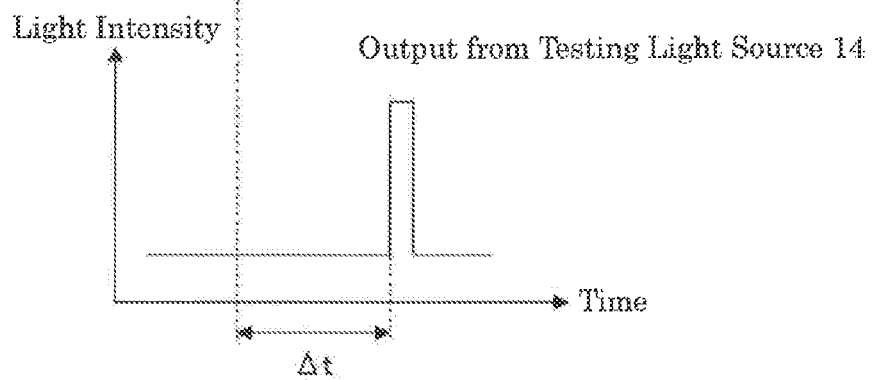
FIG. 5B shows timing chart of a testing light pulse output from the testing light source 14 according to the first embodiment.

FIG. 5 shows timing charts of a testing light pulse output from the testing light source 12 (FIG. 5A) and a testing light pulse output from the testing light source 14 (FIG. 5B) according to the first embodiment.

The testing light source 14 is arranged to output a testing light pulse with a delay time of $\Delta t$ after the timing of a testing light pulse output from the testing light source 12. Note that $\Delta t$ is a value that satisfies $L0=(\frac{1}{2}) \times c \times \Delta t$, where c is the speed of light.

Note here that the optical path length from the testing light source 12 to the half mirror 40 has the same value as the optical path length from the testing light source 14 to the half mirror 40.

The testing light pulses output from the respective testing light sources 12, 14 then arrive at the half mirror (wave multiplexing section) 40 with a difference in the arrival time of $\Delta t$. The $\Delta t$ is a value corresponding to the interplanar distance L0 between the fixed distance planes 4a, 4b, as described above ($L0=(\frac{1}{2}) \times c \times \Delta t$).

The light source driving section 18 is arranged to drive the testing light sources 12 and 14 such that the testing light sources 12 and 14 output testing light pulses with a time difference of $\Delta t$ (see FIG. 5).

The condenser lenses 22, 24 are arranged to collimate the testing light pulses output from the testing light sources 12, 14 for incidence to the liquid crystal panels 32, 34.

The two or more liquid crystal panels (optical penetration members) 32, 34 each have optical penetration regions 400a, 400b and arranged to receive the testing light pulses from the two or more respective testing light sources 12, 14 for penetration through the optical penetration regions 400a, 400b. It is noted that a film (optical penetration member) may be used instead of a liquid crystal panel.

Figure 4A:
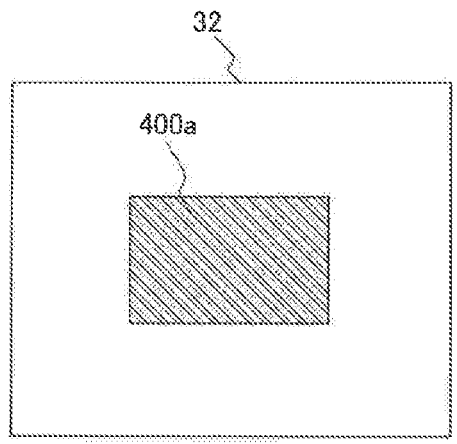
FIG. 4A shows the optical penetration region 400a of the liquid crystal panel (optical penetration member) 32 according to the first embodiment.
Figure 4B:
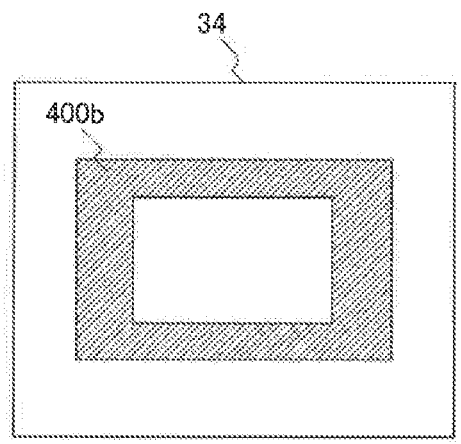
FIG. 4B shows the optical penetration region 400b of the liquid crystal panel (optical penetration member) 34 according to the first embodiment.
Figure 4C:
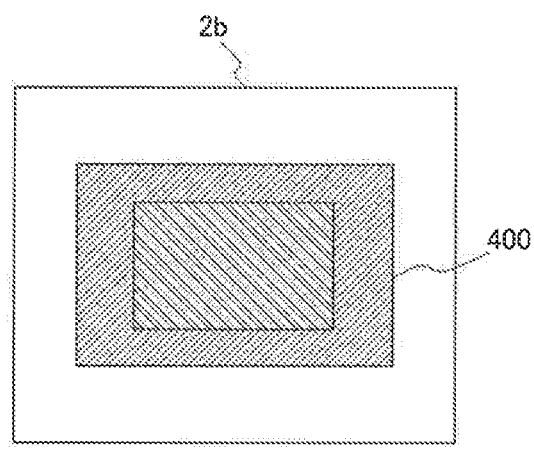
FIG. 4C shows a light receiving image 400 at the light receiving section 2b according to the first embodiment.

FIG. 4 shows the optical penetration region 400a of the liquid crystal panel (optical penetration member) 32 (FIG. 4A), the optical penetration region 400b of the liquid crystal panel (optical penetration member) 34 (FIG. 4B), and a light receiving image 400 at the light receiving section 2b (FIG. 4C) according to the first embodiment.

Referring to FIG. 4A, the optical penetration region 400a corresponds to the fixed distance plane 4a. For example, the optical penetration region 400a and the fixed distance plane 4a have the same shape.

Referring to FIG. 4B, the optical penetration region 400b corresponds to the fixed distance plane 4b. For example, the optical penetration region 400b and the fixed distance plane 4b have the same shape.

Referring to FIG. 4C, the light receiving image 400 at the light receiving section 2b is a result of superposition of the optical penetration regions 400a and 400b and corresponds to actual reception of a reflected light pulse from the incident object 4 at the light receiving section 2b.

The liquid crystal panel driving section 38 is arranged to drive the liquid crystal panels 32, 34 such that the liquid crystal panel 32 allows light to penetrate only through the optical penetration region 400a and the liquid crystal panel 34 allows light to penetrate only through the optical penetration region 400b.

The half mirror (wave multiplexing section) 40 is arranged to multiplex the testing light pulses penetrating through the liquid crystal panels 32, 34 for provision via the imaging lens 50 to the optical measuring instrument 2.

It is noted that the half mirror 40 may be a dichroic mirror. In this case, the wavelength of the testing light pulse output from the testing light source 12 is set to be different from the wavelength of the testing light pulse output from the testing light source 14.

Alternatively, the half mirror 40 may be a polarizing beam splitter. In this case, the polarization plane of the testing light pulse output from the testing light source 12 is set to be different from (e.g. orthogonal to) the polarization plane of the testing light pulse output from the testing light source 14. For example, the polarizing beam splitter is set to reflect S-polarization, while penetrate P-polarization, and the testing light pulse output from the testing light source 12 is set to be S-polarization, while the testing light pulse output from the testing light source 14 is set to be P-polarization.

The imaging lens 50 is arranged to provide the output of the half mirror 40 to the light receiving section 2b for imaging.

It is noted that the optical measuring instrument 2, which has the light receiving section 2b (see FIGS. 1 and 15), may further has an imaging lens and an optical filter. In this case, the imaging lens 50 is replaced with a collimating lens. The output of the half mirror 40 penetrates through the collimating lens (used in place of the imaging lens 50) and further the imaging lens and the optical filter of the optical measuring instrument 2 to reach the light receiving section 2b. Such an arrangement may be made in any embodiment of the present invention.

Next will be described an operation according to the first embodiment.

The optical testing apparatus 1 first receives a trigger signal to start the following operations. Note that as such a trigger signal may be used a drive signal for making the light source 2a emit light. Alternatively, as such a trigger signal may be used an electrical signal that is a result of conversion of light emission from the light source 2a through a photoelectric convertor (not shown).

The light source driving section 18 first drives the testing light source 12 to cause the testing light source 12 to output a testing light pulse (see FIG. 5A). The testing light pulse is provided via the condenser lens 22 to the liquid crystal panel 32 and penetrates through the optical penetration region

400a of the liquid crystal panel 32 (see FIG. 4A) to be provided to the half mirror 40.

The light source driving section 18 next drives the testing light source 14 to cause the testing light source 14 to output a testing light pulse with a delay time of Δt after the testing light source 12 (see FIG. 5B). The testing light pulse is provided via the condenser lens 24 to the liquid crystal panel 34 and penetrates through the optical penetration region 400b of the liquid crystal panel 34 (see FIG. 4B) to be provided to the half mirror 40.

The testing light pulses penetrating through the liquid crystal panels 32, 34 are multiplexed through the half mirror 40 and provided via the imaging lens 50 to the light receiving section 2b of the optical measuring instrument 2 (light receiving step) (see FIG. 4C).

Based on a light receiving result in the light receiving step, the optical measuring instrument 2 obtains the shape of any one or more of the optical penetration regions 400a and 400b and, based on this, obtains the shape of any one or more of the fixed distance planes 4a and 4b (shape obtaining step).

For example, the optical measuring instrument 2 obtains the shapes of the optical penetration regions 400a and 400b. This is the same as acquiring an image of the incident object 4 that has a step (interplanar distance) L0. Accordingly, the optical measuring instrument 2 sets the obtained shapes of the optical penetration regions 400a and 400b, respectively, as the shapes of the fixed distance planes 4a and 4b.

Alternatively, for example, the optical measuring instrument 2 obtains the shape of only the optical penetration region 400a. This is the same as acquiring an image of the fixed distance plane 4a of the incident object 4 (the fixed distance plane 4b is merely a background). Accordingly, the optical measuring instrument 2 sets the obtained shape of the optical penetration region 400a as the shape of the fixed distance plane 4a.

Alternatively, for example, the optical measuring instrument 2 obtains the shape of only the optical penetration region 400b. This is the same as acquiring an image of the fixed distance plane 4b of the incident object 4 (the fixed distance plane 4a is merely a noise). Accordingly, the optical measuring instrument 2 sets the obtained shape of the optical penetration region 400b as the shape of the fixed distance plane 4b.

Finally, based on the obtained shape, the light receiving performance of the optical measuring instrument 2 is evaluated (performance evaluating step). When the shapes of both the fixed distance planes 4a and 4b are obtained, the obtained shapes of the fixed distance planes 4a, 4b are compared with the true known shapes of the fixed distance planes 4a, 4b to evaluate the light receiving performance based on how close to the true values. When the shape of the fixed distance plane 4a (or the fixed distance plane 4b) is obtained, it is compared with the true known shape of the fixed distance plane 4a (or the fixed distance plane 4b) to evaluate the light receiving performance based on how close to the true value.

In accordance with the first embodiment, it is possible to test the optical measuring instrument 2 without reproducing an actual measurement expected environment (e.g. the incident object 4).

<Variation>

It is noted that the first embodiment can have the following variation.

The arrangement of the variation is the same as that of the first embodiment and will not be described. The operation in the variation up to the light receiving step is also the same as that of the first embodiment and will not be described.

Based on a light receiving result in the light receiving step, the optical measuring instrument 2 obtains the boundary between the optical penetration regions 400a and 400b and, based on this, obtains the boundary between the fixed distance planes 4a and 4b (boundary obtaining step).

For example, the optical measuring instrument 2 obtains the boundary between the optical penetration regions 400a and 400b. This is the same as acquiring an image of the boundary between the fixed distance planes 4a and 4b in the incident object 4 that has a step (interplanar distance) L0. Accordingly, the optical measuring instrument 2 sets the obtained boundary between the optical penetration regions 400a and 400b as the boundary between the fixed distance planes 4a and 4b.

Finally, based on the obtained boundary, the light receiving performance of the optical measuring instrument 2 is evaluated (performance evaluating step). Based on how the obtained boundary is blurred, the crosstalk between adjacent pixels of the light receiving section 2b can be evaluated as a type of light receiving performance. The more the blurring, the higher the crosstalk and therefore the lower the performance is.

In accordance with the variation to the first embodiment, it is possible to test the crosstalk of the optical measuring instrument 2 without reproducing an actual measurement expected environment (e.g. the incident object 4).

Second Embodiment

The optical testing apparatus 1 according to a second embodiment differs from that of the first embodiment in that there are three testing light sources 12, 14, 16 and three liquid crystal panels (optical penetration members) 32, 34, 36 and further there is a dichroic mirror 42 in place of the half mirror 40 to address the case where three fixed distance planes 4a, 4b, 4c exist in the incident object 4 (see FIG. 7).

The actual use aspect of the optical measuring instrument 2 is the same as that of the first embodiment and will not be described (see FIG. 1). The incident object 4, however, is different from that in the first embodiment and will hereinafter be described.

Figure 7A:
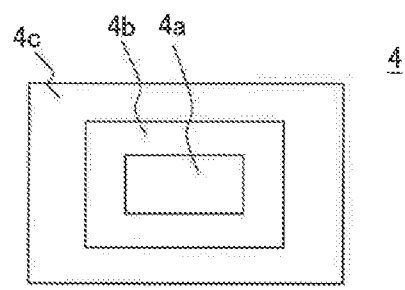
FIG. 7A shows a plan view of the incident object 4 according to the second embodiment.
Figure 7B:
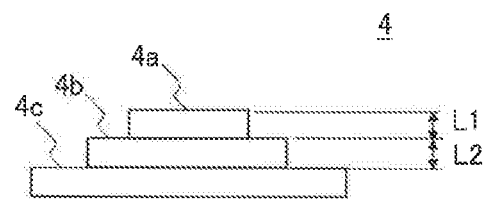
FIG. 7B shows a front view of the incident object 4 according to the second embodiment.

FIG. 7 shows a plan view (FIG. 7A) and a front view (FIG. 7B) of the incident object 4 according to the second embodiment. Referring to FIG. 7, the incident object 4 has a three-stepped shape with a convex portion further provided on an incident object 4 according to the first embodiment (see FIG. 2). The optical measuring instrument 2 is located immediately above the incident object 4, and the planes 4a, 4b, and 4c have their respective fixed distances from the optical measuring instrument 2. The planes 4a, 4b, and 4c will hereinafter be referred to as fixed distance planes 4a, 4b, 4c. It is noted that the steps in the incident object 4 are the distance L1 between the fixed distance planes 4a and 4b (hereinafter referred to as "interplanar distance") and the distance L2 between the fixed distance planes 4b and 4c (hereinafter referred to as "interplanar distance").

Figure 6:
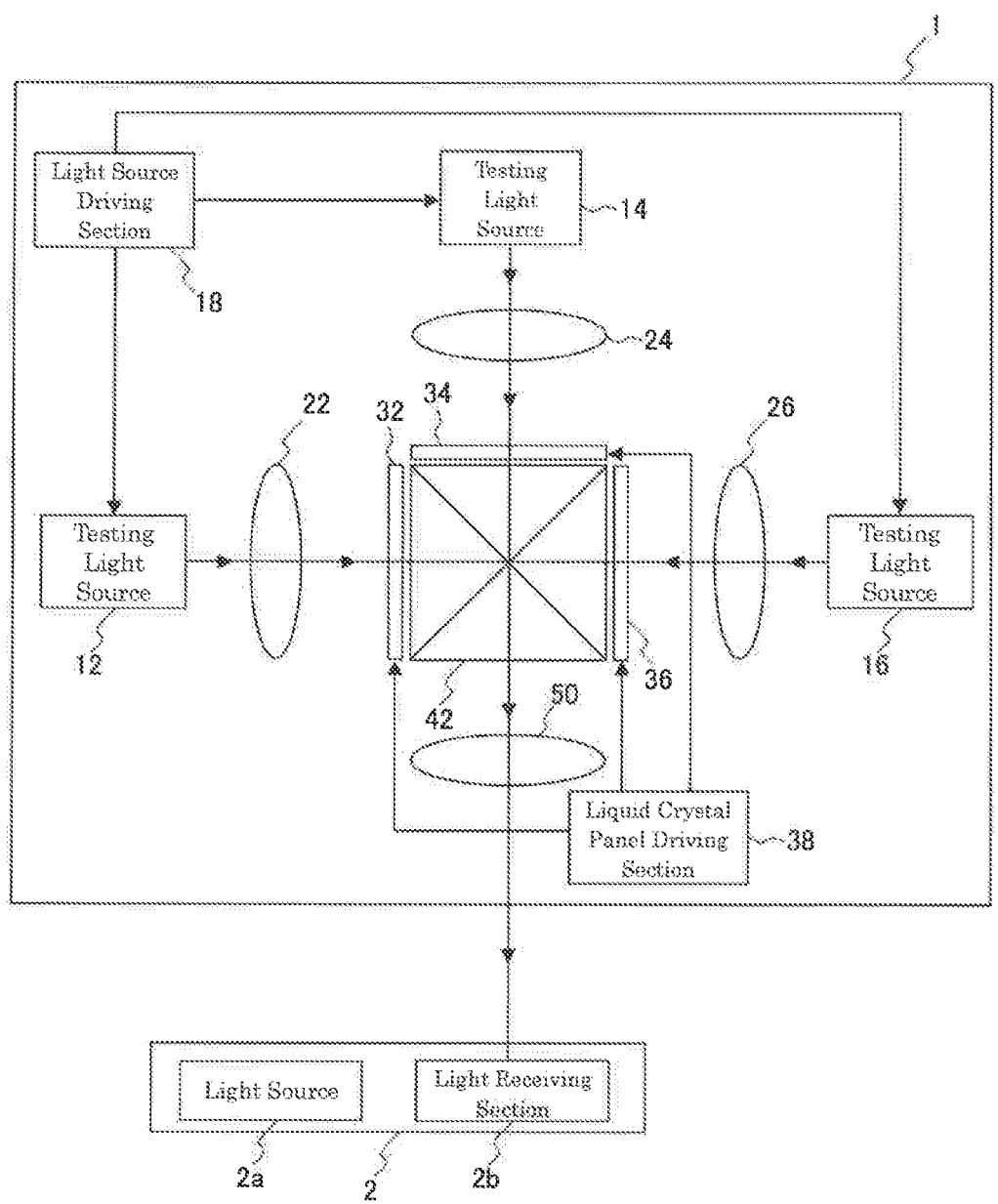
FIG. 6 is a functional block diagram showing the configuration of an optical testing apparatus 1 according to the second embodiment of the present invention.

FIG. 6 is a functional block diagram showing the configuration of an optical testing apparatus 1 according to the second embodiment of the present invention. Referring to FIG. 6, the optical testing apparatus 1 according to the second embodiment includes testing light sources 12, 14, 16, a light source driving section 18, condenser lenses 22, 24, 26, liquid crystal panels (optical penetration members) 32, 34, 36, a liquid crystal panel driving section 38, a dichroic mirror (wave multiplexing section) 42, and an imaging lens 50.

The three testing light sources 12, 14, 16 are each arranged to output a testing light pulse. It is noted that the testing light sources 12, 14, 16 are, for example, laser diodes.

Figure 9A:
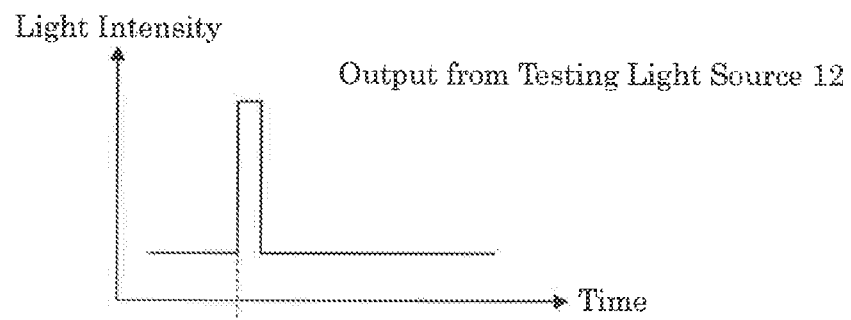
FIG. 9A shows timing chart of a testing light pulse output from the testing light source 12 according to the second embodiment.
Figure 9B:
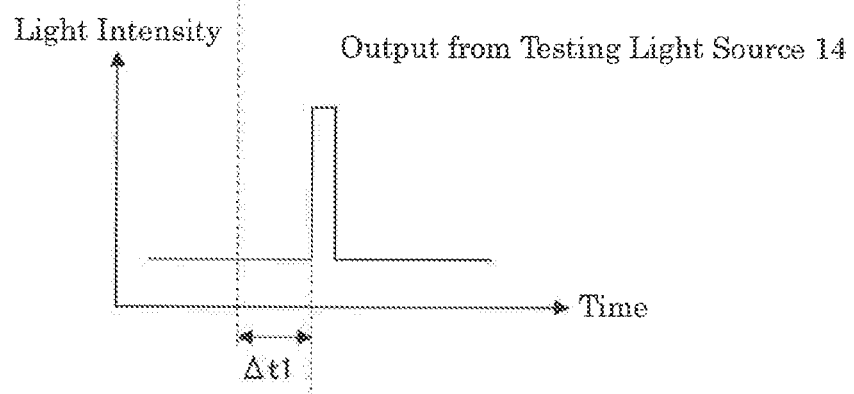
FIG. 9B shows timing chart of a testing light pulse output from the testing light source 14 according to the second embodiment.
Figure 9C:
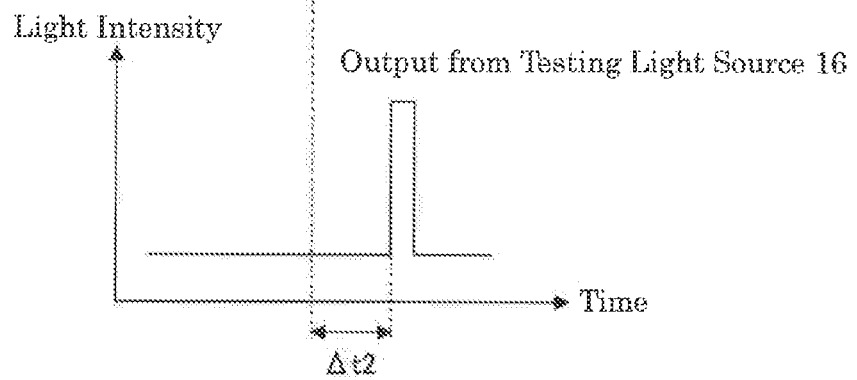
FIG. 9C shows timing chart of a testing light pulse output from the testing light source 16 according to the second embodiment.

FIG. 9 shows timing charts of a testing light pulse output from the testing light source 12 (FIG. 9A), a testing light pulse output from the testing light source 14 (FIG. 9B), and a testing light pulse output from the testing light source 16 (FIG. 9C) according to the second embodiment.

The testing light source 14 is arranged to output a testing light pulse with a delay time of $\Delta t1$ after the timing of a testing light pulse output from the testing light source 12. Further, the testing light source 16 is arranged to output a testing light pulse with a delay time of $\Delta t2$ after the timing of a testing light pulse output from the testing light source 14.

Note that $\Delta t1$ is a value that satisfies $L1=(½) \times c \times \Delta t1$ and $\Delta t2$ is a value that satisfies $L2=(½) \times c \times \Delta t2$, where c is the speed of light.

Note here that the optical path length from the testing light source 12 to the dichroic mirror 42, the optical path length from the testing light source 14 to the dichroic mirror 42, and the optical path length from the testing light source 16 to the dichroic mirror 42 have the same value.

The testing light pulses output from the respective testing light sources 12, 14 (testing light sources 14, 16) then arrive at the dichroic mirror (wave multiplexing section) 42 with a difference in the arrival time of $\Delta t1$ ($\Delta t2$). The $\Delta t1$ ($\Delta t2$) is a value corresponding to the interplanar distance L1 (L2) between the fixed distance planes 4a, 4b (4b, 4c), as described above.

The light source driving section 18 is arranged to drive the testing light sources 12, 14, and 16 such that the testing light sources 12, 14, and 16 output testing light pulses with time differences of $\Delta t1$, $\Delta t2$ (see FIG. 9).

The condenser lenses 22, 24, 26 are arranged to collimate the testing light pulses output from the testing light sources 12, 14, 16 for incidence to the liquid crystal panels 32, 34, 36.

The three liquid crystal panels (optical penetration members) 32, 34, 36 each have optical penetration regions 400a, 400b, 400c and arranged to receive the testing light pulses from the three respective testing light sources 12, 14, 16 for penetration through the optical penetration regions 400a, 400b, 400c. It is noted that a film (optical penetration member) may be used instead of a liquid crystal panel.

Figure 8A:
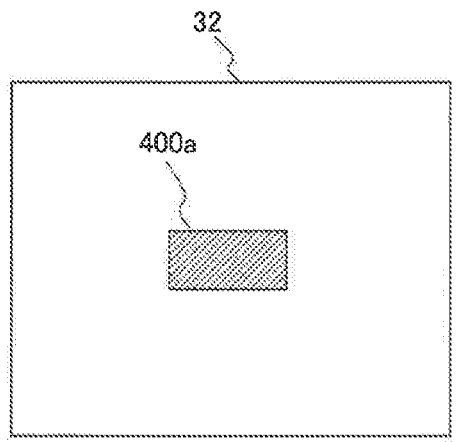
FIG. 8A shows the optical penetration region 400a of the liquid crystal panel (optical penetration member) 32 according to the second embodiment.
Figure 8B:
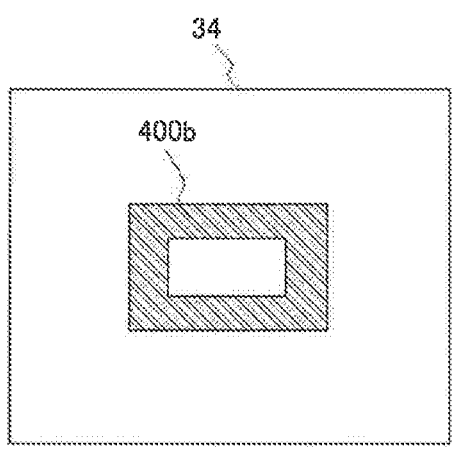
FIG. 8B shows the optical penetration region 400b of the liquid crystal panel (optical penetration member) 34 according to the second embodiment.
Figure 8C:
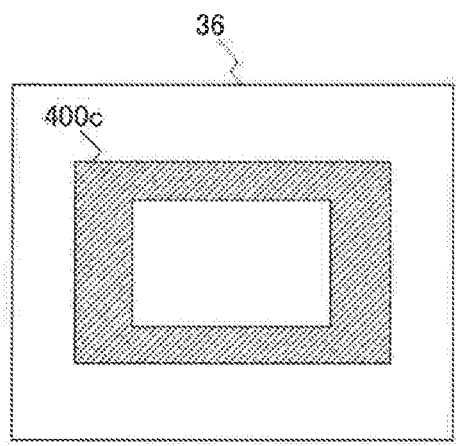
FIG. 8C shows the optical penetration region 400c of the liquid crystal panel (optical penetration member) 36 according to the second embodiment.

FIG. 8 shows the optical penetration region 400a of the liquid crystal panel (optical penetration member) 32 (FIG. 8A), the optical penetration region 400b of the liquid crystal panel (optical penetration member) 34 (FIG. 8B), and the optical penetration region 400c of the liquid crystal panel (optical penetration member) 36 (FIG. 8C) according to the second embodiment.

Referring to FIG. 8A, the optical penetration region 400a corresponds to the fixed distance plane 4a. For example, the optical penetration region 400a and the fixed distance plane 4a have the same shape. Referring to FIG. 8B, the optical penetration region 400b corresponds to the fixed distance plane 4b. For example, the optical penetration region 400b and the fixed distance plane 4b have the same shape. Referring to FIG. 8C, the optical penetration region 400c corresponds to the fixed distance plane 4c. For example, the optical penetration region 400c and the fixed distance plane 4c have the same shape.

The liquid crystal panel driving section 38 is arranged to drive the liquid crystal panels 32, 34, 36 such that the liquid crystal panel 32 allows light to penetrate only through the optical penetration region 400a, the liquid crystal panel 34 allows light to penetrate only through the optical penetration region 400b, and the liquid crystal panel 36 allows light to penetrate only through the optical penetration region 400c.

The dichroic mirror (wave multiplexing section) 42 is arranged to multiplex the testing light pulses penetrating through the liquid crystal panels 32, 34, 36 for provision via the imaging lens 50 to the optical measuring instrument 2. It is noted that the wavelength of the testing light pulse output from the testing light source 12, the wavelength of the testing light pulse output from the testing light source 14, and the wavelength of the testing light pulse output from the testing light source 16 are set to be different from each other.

The imaging lens 50 is arranged to provide the output of the dichroic mirror 42 to the light receiving section 2b for imaging.

Next will be described an operation according to the second embodiment.

The light source driving section 18 first drives the testing light source 12 to cause the testing light source 12 to output a testing light pulse (see FIG. 9A). The testing light pulse is provided via the condenser lens 22 to the liquid crystal panel 32 and penetrates through the optical penetration region 400a of the liquid crystal panel 32 (see FIG. 8A) to be provided to the dichroic mirror 42.

The light source driving section 18 next drives the testing light source 14 to cause the testing light source 14 to output a testing light pulse with a delay time of $\Delta t1$ after the testing light source 12 (see FIG. 9B). The testing light pulse is provided via the condenser lens 24 to the liquid crystal panel 34 and penetrates through the optical penetration region 400b of the liquid crystal panel 34 (see FIG. 8B) to be provided to the dichroic mirror 42.

The light source driving section 18 further drives the testing light source 16 to cause the testing light source 16 to output a testing light pulse with a delay time of $\Delta t2$ after the testing light source 14 (see FIG. 9C). The testing light pulse is provided via the condenser lens 26 to the liquid crystal panel 36 and penetrates through the optical penetration region 400c of the liquid crystal panel 36 (see FIG. 8C) to be provided to the dichroic mirror 42.

The testing light pulses penetrating through the liquid crystal panels 32, 34, 36 are multiplexed through the dichroic mirror 42 and provided via the imaging lens 50 to the light receiving section 2b of the optical measuring instrument 2 (light receiving step).

Based on a light receiving result in the light receiving step, the optical measuring instrument 2 obtains the shape of any one or more of the fixed distance planes 4a, 4b, and 4c (shape obtaining step).

For example, the optical measuring instrument 2 obtains the shapes of the optical penetration regions 400a, 400b, and 400c. This is the same as acquiring an image of the incident object 4 that has steps (interplanar distances) L1, L2. Accordingly, the optical measuring instrument 2 sets the obtained shapes of the optical penetration regions 400a, 400b, and 400c, respectively, as the shapes of the fixed distance planes 4a, 4b, and 4c.

Alternatively, for example, the optical measuring instrument 2 obtains the shape of only the optical penetration region 400b. This is the same as acquiring an image of the fixed distance plane 4b of the incident object 4 (the fixed distance plane 4a is merely a noise and the fixed distance plane 4c is merely a background). Accordingly, the optical measuring instrument 2 sets the obtained shape of the optical penetration region 400b as the shape of the fixed distance plane 4b.

Finally, based on the obtained shape, the light receiving performance of the optical measuring instrument 2 is evaluated (performance evaluating step). When the shapes of the fixed distance planes 4a, 4b, and 4c are obtained, the obtained shapes of the fixed distance planes 4a, 4b, 4c are compared with the true known shapes of the fixed distance planes 4a, 4b, 4c to evaluate the light receiving performance based on how close to the true values. When the shape of the fixed distance plane 4b is obtained, it is compared with the true known shape of the fixed distance plane 4b to evaluate the light receiving performance based on how close to the true value.

The second embodiment also exhibits the same advantageous effects as the first embodiment.

It is noted that as is the case with the variation to the first embodiment, the boundary between the optical penetration regions 400a and 400b may be obtained and set as the boundary between the fixed distance planes 4a and 4b, while the boundary between the optical penetration regions 400b and 400c may be obtained and set as the boundary between the fixed distance planes 4b and 4c (boundary obtaining step) and, based on the obtained boundaries, the light receiving performance of the optical measuring instrument 2 may be evaluated (performance evaluating step). Also in this case, based on how the obtained boundary is blurred, the crosstalk between adjacent pixels of the light receiving section 2b can be evaluated as a type of light receiving performance. The more the blurring, the higher the crosstalk and therefore the lower the performance is.

It is noted that while three testing light pulses are multiplexed in the second embodiment, four or more testing light pulses can be multiplexed through addition of wave multiplexing sections.

Third Embodiment

The optical testing apparatus 1 according to a third embodiment differs from that of the first embodiment in that the distance measurement by the optical measuring instrument 2 is tested.

The arrangement of the optical testing apparatus 1 according to the third embodiment of the present invention is the same as that of the first embodiment and will not be described (see FIG. 3). However, the incident object 4 (see FIG. 10), the optical penetration regions 400a, 400b (see FIG. 11), and the output timing of testing light pulses (see FIG. 12) are different from those of the first embodiment and will hereinafter be described.

Figure 10A:
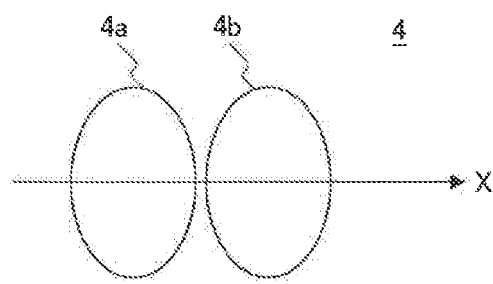
FIG. 10A shows a plan view of the incident object 4 according to the third embodiment.
Figure 10B:
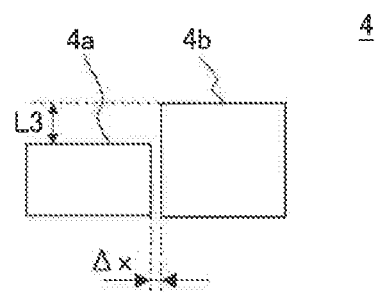
FIG. 10B shows a front view of the incident object 4 according to the third embodiment.

FIG. 10 shows a plan view (FIG. 10A) and a front view (FIG. 10B) of the incident object 4 according to the third embodiment.

Referring to FIG. 10, the incident object 4 includes two elliptical cylinders arranged in the horizontal direction (x-direction: see FIG. 10A). The left elliptical cylinder has a height lower by L3 than that of the right elliptical cylinder. The optical measuring instrument 2 is located immediately above the incident object 4, and the planes 4a and 4b, which are top surfaces of the two elliptical cylinders, have their respective fixed distances from the optical measuring instrument 2. The planes 4a and 4b will hereinafter be referred to as fixed distance planes 4a, 4b. It is noted that the distance between the fixed distance planes 4a and 4b (hereinafter referred to as "interplanar distance") is L3. The spacing between the two elliptical cylinders (the distance between the right end of the left elliptical cylinder and the left end of the right elliptical cylinder) is also defined as $\Delta x$.

Figure 12A:
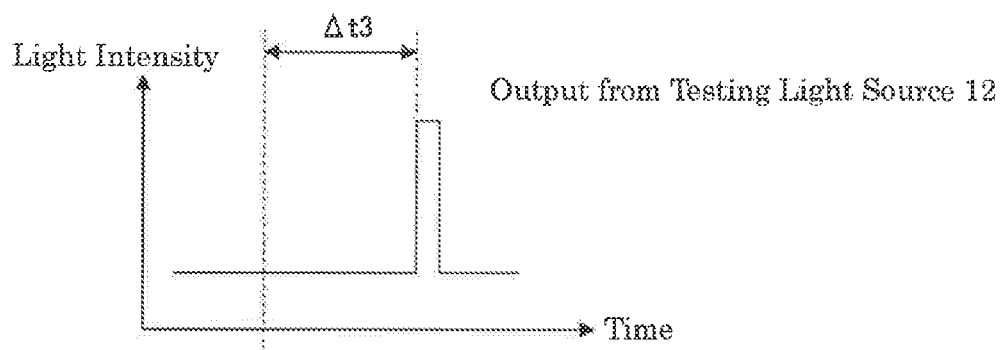
FIG. 12A shows timing chart of a testing light pulse output from the testing light source 12 according to the third embodiment.
Figure 12B:
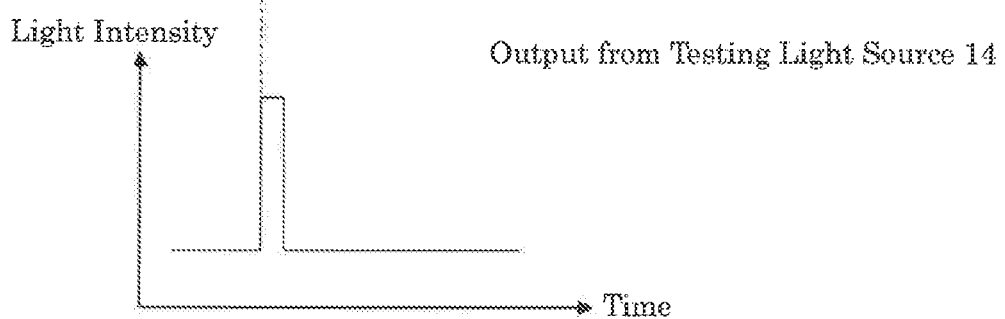
FIG. 12B shows timing chart of a testing light pulse output from the testing light source 14 according to the third embodiment.

FIG. 12 shows timing charts of a testing light pulse output from the testing light source 12 (FIG. 12A) and a testing light pulse output from the testing light source 14 (FIG. 12B) according to the third embodiment.

The testing light source 14 is arranged to output a testing light pulse with an advance time of $\Delta t3$ before the timing of a testing light pulse output from the testing light source 12. Note that $\Delta t3$ is a value that satisfies $L3=(½) \times c \times \Delta t3$, where c is the speed of light.

Note here that the optical path length from the testing light source 12 to the half mirror 40 has the same value as the optical path length from the testing light source 14 to the half mirror 40.

The testing light pulses output from the respective testing light sources 12, 14 then arrive at the half mirror (wave multiplexing section) 40 with a difference in the arrival time of $\Delta t3$. The $\Delta t3$ is a value corresponding to the interplanar distance L3 between the fixed distance planes 4a, 4b, as described above ($L3=(½) \times c \times \Delta t3$).

Figure 11A:
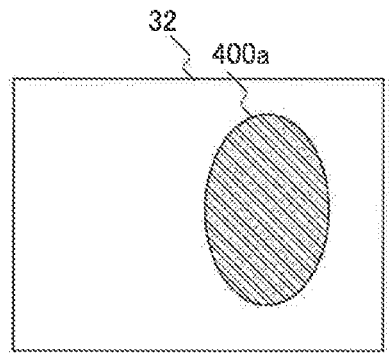
FIG. 11A shows the optical penetration region 400a of the liquid crystal panel (optical penetration member) 32 according to the third embodiment.
Figure 11B:
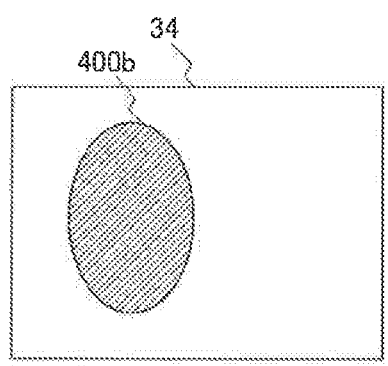
FIG. 11B shows the optical penetration region 400b of the liquid crystal panel (optical penetration member) 34 according to the third embodiment.
Figure 11C:
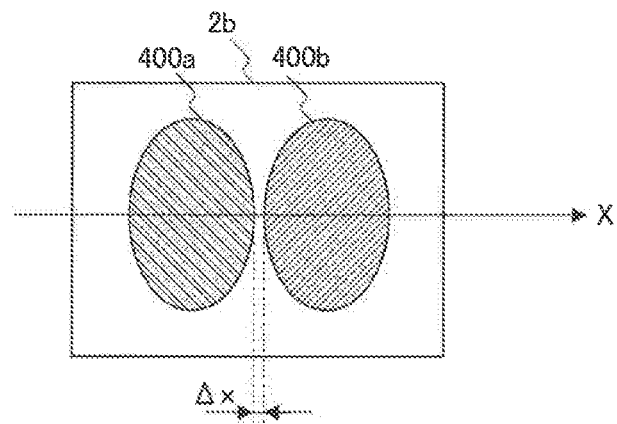
FIG. 11C shows a light receiving image 400 at the light receiving section 2b according to the third embodiment.

FIG. 11 shows the optical penetration region 400a of the liquid crystal panel (optical penetration member) 32 (FIG. 11A), the optical penetration region 400b of the liquid crystal panel (optical penetration member) 34 (FIG. 11B), and a light receiving image 400 at the light receiving section 2b (FIG. 11C) according to the third embodiment.

Referring to FIG. 11A, the optical penetration region 400a corresponds to the fixed distance plane 4a. For example, the optical penetration region 400a and the fixed distance plane 4a have the same shape.

Referring to FIG. 11B, the optical penetration region 400b corresponds to the fixed distance plane 4b. For example, the optical penetration region 400b and the fixed distance plane 4b have the same shape.

Referring to FIG. 11C, the light receiving image 400 at the light receiving section 2b is a result of superposition of the testing light pulse penetrating through the optical penetration regions 400a and the testing light pulse penetrating through the optical penetration regions 400b and corresponds to actual reception of a reflected light pulse from the incident object 4 at the light receiving section 2b. Due to left-right reversal through the half mirror 40, however, the right-ended optical penetration region 400a (see FIG. 11A) moves to the left end, while the left-ended optical penetration region 400b (see FIG. 11B) moves to the right end at the light receiving section 2b (see FIG. 11C).

Next will be described an operation according to the third embodiment.

The operation in the third embodiment up to the light receiving step is also the same as that of the first embodiment and will not be described.

Based on a light receiving result in the light receiving step (the same as acquiring an image of the incident object 4 that has a step (interplanar distance) L3), the optical measuring instrument 2 obtains the interplanar distance L3 between the fixed distance planes 4a and 4b (interplanar distance obtaining step). Finally, based on the obtained interplanar distance L3, the light receiving performance of the optical measuring instrument 2 is evaluated (performance evaluating step).

It is noted that the testing light pulse penetrating through the optical penetration region 400a is provided to the light receiving section 2b with a delay time of $\Delta t3$ relative to the testing light pulse penetrating through the optical penetration region 400b. In the interplanar distance obtaining step, the time $\Delta t3$ is detected at the light receiving section 2b to obtain the interplanar distance L3 ($=(½) \times c \times \Delta t3$).

Figure 13A:
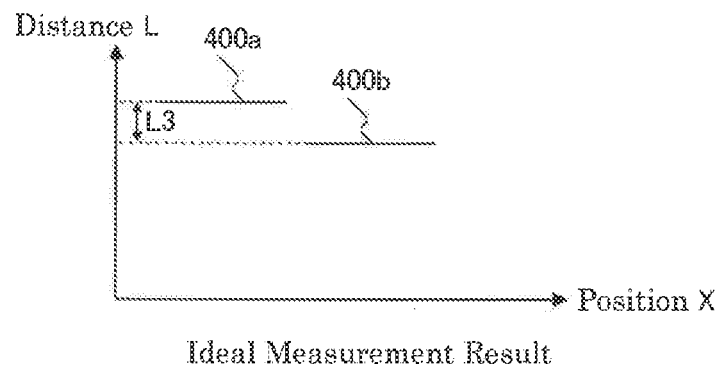
FIG. 13A shows an ideal measurement result by the optical measuring instrument 2 when the optical testing apparatus 1 according to the third embodiment is used.
Figure 13B:
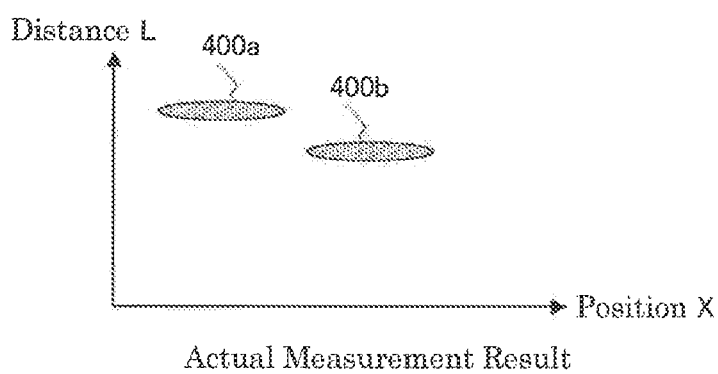
FIG. 13B shows an actual measurement result by the optical measuring instrument 2 when the optical testing apparatus 1 according to the third embodiment is used.
Figure 13C:
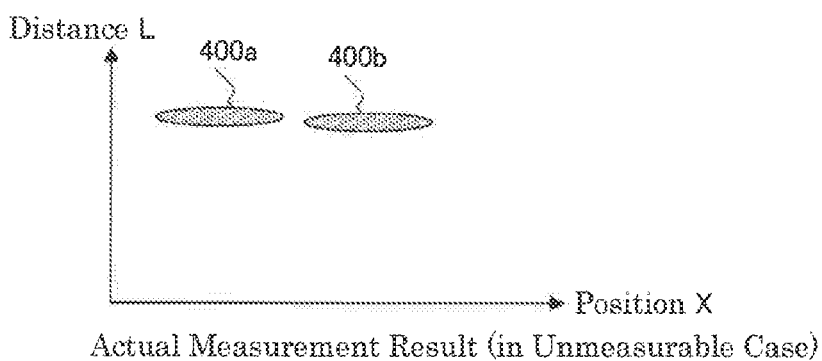
FIG. 13C shows an actual measurement result in an unmeasurable case by the optical measuring instrument 2 when the optical testing apparatus 1 according to the third embodiment is used.

FIG. 13 shows measurement results by the optical measuring instrument 2 when the optical testing apparatus 1 according to the third embodiment is used, including an ideal measurement result (FIG. 13A), an actual measurement result (FIG. 13B), and an actual measurement result in an unmeasurable case (FIG. 13C).

Referring to FIG. 13A, the measurement results for the optical penetration regions 400a and 400b ideally have their respective constant L-coordinate (corresponding to the distance L between the optical measuring instrument 2 and the incident object 4) values with a difference of L3 therebetween.

However, referring to FIG. 13B, due to measurement errors, the measurement results for the optical penetration regions 400a and 400b do not actually have their respective constant L-coordinate (corresponding to the distance L) values with some degree of variation for each pixel of the light receiving section 2b. Even in such a case, by obtaining the median or average value for L coordinates of the measurement results for each optical penetration region 400a (the optical penetration region 400b), the difference between the measurement results is equal to L3.

However, referring to FIG. 13C, if the interplanar distance L3 is small, the L coordinates of the measurement results for each optical penetration region 400a (the optical penetration region 400b) overlap each other, whereby the interplanar distance L3 cannot be obtained from the difference between the L coordinates of the measurement results for the optical penetration region 400a and 400b.

The light receiving performance of the optical measuring instrument 2 can be evaluated by obtaining the minimum value (i.e. resolution) of the interplanar distance L3 that is measurable without the result as shown in FIG. 13C.

In accordance with the third embodiment, it is possible to test the optical measuring instrument 2 (measure the resolution of the optical measuring instrument 2 for the distance measurement in the L direction) without reproducing an actual measurement expected environment (e.g. the incident object 4).

Fourth Embodiment

The optical testing apparatus 1 according to a fourth embodiment differs from that of the third embodiment in that the position measurement in the horizontal direction (X-direction) by the optical measuring instrument 2 is tested.

The arrangement of the optical testing apparatus 1 according to the fourth embodiment of the present invention is the same as that of the third embodiment and will not be described.

Next will be described an operation according to the fourth embodiment.

The operation in the fourth embodiment up to the light receiving step is also the same as that of the third embodiment and will not be described.

Based on a light receiving result in the light receiving step (the same as acquiring an image of the incident object 4 that has a step (interplanar distance) L3), the optical measuring instrument 2 obtains the horizontal distance (e.g. Δx in FIG. 10) between any two points (e.g. the right end of the left elliptical cylinder and the left end of the right elliptical cylinder in FIG. 10) in the incident object 4 (horizontal distance obtaining step). Note that the horizontal direction (X-direction) is orthogonal to the normal direction of the fixed distance planes 4a, 4b (see FIG. 10). Finally, based on the obtained horizontal distance Δx, the light receiving performance of the optical measuring instrument 2 is evaluated (performance evaluating step).

It is noted that in the horizontal distance obtaining step, the distance between the right end (corresponding to the right end of the left elliptical cylinder in FIG. 10) of the image acquired at the light receiving section 2b from the testing light pulse penetrating through the optical penetration region 400a and the left end (corresponding to the left end of the right elliptical cylinder in FIG. 10) of the image acquired at the light receiving section 2b from the testing light pulse penetrating through the optical penetration region 400b is defined as the horizontal distance Δx.

Figure 14A:
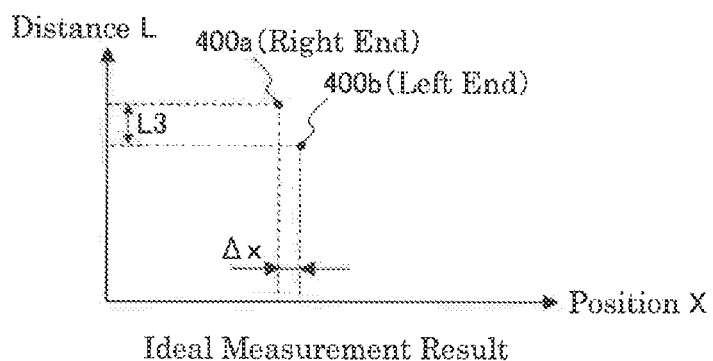
FIG. 14A shows an ideal measurement result by the optical measuring instrument 2 when the optical testing apparatus 1 according to the fourth embodiment is used.
Figure 14B:
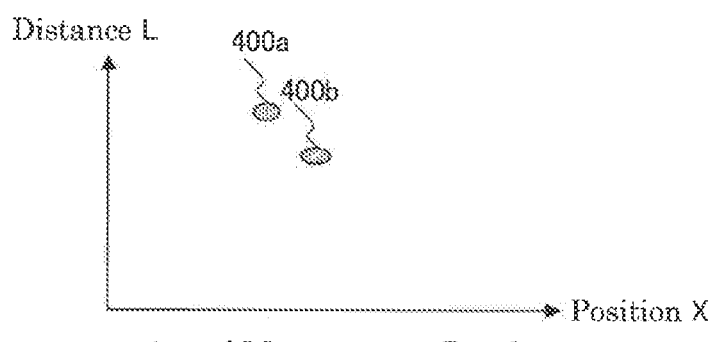
FIG. 14B shows an actual measurement result by the optical measuring instrument 2 when the optical testing apparatus 1 according to the fourth embodiment is used.
Figure 14C:
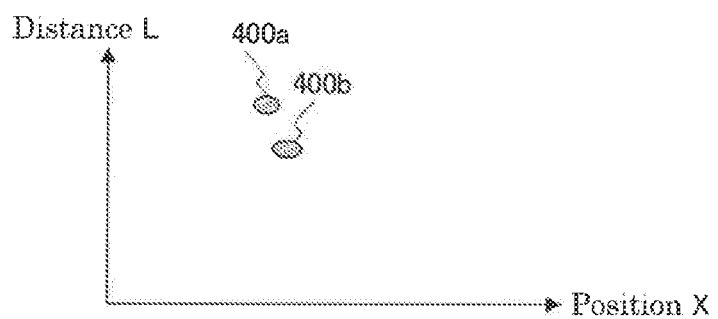
FIG. 14C shows an actual measurement result in an unmeasurable case by the optical measuring instrument 2 when the optical testing apparatus 1 according to the fourth embodiment is used.

FIG. 14 shows measurement results by the optical measuring instrument 2 when the optical testing apparatus 1 according to the fourth embodiment is used, including an ideal measurement result (FIG. 14A), an actual measurement result (FIG. 14B), and an actual measurement result in an unmeasurable case (FIG. 14C).

Referring to FIG. 14A, the measurement results for the right end of the optical penetration region 400a and the left end of the optical penetration region 400b ideally have their respective X-coordinate values with a difference of Δx therebetween.

However, referring to FIG. 14B, due to measurement errors, the measurement results for the right end of the optical penetration region 400a and the left end of the optical penetration region 400b do not actually have their respective constant X-coordinate values with some degree of variation for each pixel of the light receiving section 2b. Even in such a case, by obtaining, for example, the median or average value for X coordinates of the measurement results for the right end of the optical penetration region 400a (the left end of the optical penetration region 400b), the difference between the measurement results is approximately equal to Δx.

However, referring to FIG. 14C, if the Δx is small, the X coordinates of the measurement results for the right end of the optical penetration region 400a and the left end of the optical penetration region 400b overlap each other, whereby the Δx cannot be obtained from the difference between the X coordinates of the measurement results for the right end of the optical penetration region 400a and the left end of the optical penetration region 400b.

The light receiving performance of the optical measuring instrument 2 can be evaluated by obtaining the minimum value (i.e. resolution) of the horizontal distance Δx that is measurable without the result as shown in FIG. 14C.

In accordance with the fourth embodiment, it is possible to test the optical measuring instrument 2 (measure the resolution of the optical measuring instrument 2 for the position measurement in the horizontal direction (X-direction)) without reproducing an actual measurement expected environment.

DESCRIPTION OF REFERENCE NUMERAL

2 Optical Measuring Instrument
2a Light Source
2b Light Receiving Section
4 Incident Object
4a, 4b, 4c Fixed Distance Plane
1 Optical Testing Apparatus
12, 14, 16 Testing Light Source
22, 24, 26 Condenser Lens
18 Light Source Driving Section
32, 34, 36 Liquid Crystal Panel (Optical Penetration Member)

400a, 400b Optical Penetration Region
400 Light Receiving Image
38 Liquid Crystal Panel Driving Section
40 Half Mirror (Wave Multiplexing Section)
42 Dichroic Mirror (Wave Multiplexing Section)
50 Imaging Lens

What is claimed is:

1. An optical testing apparatus used in testing an optical measuring instrument that provides an incident light pulse from a light source to an incident object and receives a reflected light pulse as a result of reflection of the incident light pulse at the incident object, the optical testing apparatus comprising:
  two or more testing light sources that each output a testing light pulse;
  two or more optical penetration members that each have an optical penetration region and receive the testing light pulse from one of the two or more testing light sources for penetration through the optical penetration region; and
  a wave multiplexing section that multiplexes the testing light pulses penetrating through the two or more optical penetration members for provision to the optical measuring instrument, wherein
  the optical penetration regions correspond, respectively, to fixed distance planes each having a fixed distance from the optical measuring instrument to the incident object,
  the testing light pulses have their respective different arrival times after being output before arriving at the wave multiplexing section, and
  the difference between the arrival times corresponds to the interplanar distance between the fixed distance planes.

2. The optical testing apparatus according to claim 1, wherein
  the optical measuring instrument is a ToF sensor.

3. The optical testing apparatus according to claim 1, wherein
  the testing light sources are laser diodes.

4. The optical testing apparatus according to claim 1, wherein
  the testing light sources are light emitting diodes.

5. The optical testing apparatus according to claim 1, wherein
  the optical penetration members are liquid crystal panels.

6. The optical testing apparatus according to claim 1, wherein
  the optical penetration members are films.

7. The optical testing apparatus according to claim 1, wherein
  the wave multiplexing section is a half mirror.

8. The optical testing apparatus according to claim 1, wherein
  the wave multiplexing section is a dichroic mirror.

9. The optical testing apparatus according to claim 1, wherein
  the wave multiplexing section is a polarizing beam splitter.

10. A method of testing an optical measuring instrument comprising:
  receiving, by the optical measuring instrument, a resultant of multiplexing of the testing light pulses from the optical testing apparatus according to claim 1;
  obtaining the shape of any one or more of the fixed distance planes based on a light receiving result in the receiving the resultant; and
  evaluating the light receiving performance of the optical measuring instrument based on the obtained shape.

11. A method of testing an optical measuring instrument comprising:
  receiving, by the optical measuring instrument, a resultant of multiplexing of the testing light pulses from the optical testing apparatus according to claim 1;
  obtaining the boundary between the fixed distance planes based on a light receiving result in the receiving the resultant; and
  evaluating the light receiving performance of the optical measuring instrument based on the obtained boundary.

12. A method of testing an optical measuring instrument comprising:
  receiving, by the optical measuring instrument, a resultant of multiplexing of the testing light pulses from the optical testing apparatus according to claim 1;
  obtaining the interplanar distance between the fixed distance planes based on a light receiving result in the receiving the resultant; and
  evaluating the light receiving performance of the optical measuring instrument based on the obtained interplanar distance.

13. A method of testing an optical measuring instrument comprising:
  receiving, by the optical measuring instrument, a resultant of multiplexing of the testing light pulses from the optical testing apparatus according to claim 1;
  obtaining the horizontal distance between any two points in the incident object based on a light receiving result in the receiving the resultant; and
  evaluating the light receiving performance of the optical measuring instrument based on the obtained horizontal distance, wherein
  the horizontal direction is orthogonal to the normal direction of the fixed distance planes.

* * * * *